(12) United States Patent
Kurz et al.

(10) Patent No.: US 9,261,202 B2
(45) Date of Patent: Feb. 16, 2016

(54) VALVE ASSEMBLY WITH A TWO-PART HOUSING AND PRESS-IN RING

(75) Inventors: Edgar Kurz, Heilbronn-Horkheim (DE); Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 775 days.

(21) Appl. No.: 13/519,890

(22) PCT Filed: Nov. 5, 2010

(86) PCT No.: PCT/EP2010/066861
§ 371 (c)(1),
(2), (4) Date: Dec. 3, 2012

(87) PCT Pub. No.: WO2011/079992
PCT Pub. Date: Jul. 7, 2011

(65) Prior Publication Data
US 2013/0075638 A1  Mar. 28, 2013

(30) Foreign Application Priority Data
Dec. 29, 2009  (DE) .......................... 10 2009 060 729

(51) Int. Cl.
*F16K 31/06* (2006.01)
*F16K 27/02* (2006.01)
*B60T 8/36* (2006.01)

(52) U.S. Cl.
CPC .............. *F16K 27/029* (2013.01); *B60T 8/363* (2013.01); *B60T 8/3675* (2013.01); *F16K 31/06* (2013.01); *F16K 31/0658* (2013.01)

(58) Field of Classification Search
CPC ..... B60T 8/363; B60T 8/3675; F16K 27/029; F16K 31/06; F16K 31/0658

USPC .................................. 251/129.15; 303/119.2
See application file for complete search history.

(56) References Cited

U.S. PATENT DOCUMENTS

| 3,707,992 A | * | 1/1973 | Ellison et al. | 137/625.65 |
| 4,828,335 A | * | 5/1989 | Fuller et al. | 303/119.3 |
| 5,333,836 A | * | 8/1994 | Fukuyo et al. | 251/129.15 |
| 5,364,067 A | * | 11/1994 | Linkner, Jr. | 303/119.2 |
| 5,681,097 A | * | 10/1997 | Tackett et al. | 303/119.2 |

(Continued)

FOREIGN PATENT DOCUMENTS

| DE | 100 10 734 A1 | 9/2001 |
| WO | 97/28391 A1 | 8/1997 |

(Continued)

OTHER PUBLICATIONS

International Search Report corresponding to PCT Application No. PCT/EP2010/066861, mailed Jan. 17, 2011 (German and English language document) (5 pages).

*Primary Examiner* — John Bastianelli
(74) *Attorney, Agent, or Firm* — Maginot, Moore & Beck LLP

(57) ABSTRACT

A valve assembly, in particular a solenoid valve, is disclosed. The valve assembly includes an at least two-part housing that has a first housing sleeve and a second housing sleeve, the housing sleeves being held against each other by compression of a fastening zone. The valve assembly further includes a valve receptacle in which the valve is inserted and by means of which a press-in ring positioned in the region of the fastening zone is held. The press-in ring rests radially against the first housing sleeve and axially against the second housing sleeve.

18 Claims, 2 Drawing Sheets

(56) References Cited

U.S. PATENT DOCUMENTS

| | | | | |
|---|---|---|---|---|
| 5,681,098 A | * | 10/1997 | Ganzel et al. | 303/119.2 |
| 5,810,330 A | * | 9/1998 | Eith et al. | 251/129.19 |
| 6,302,499 B1 | * | 10/2001 | Linkner et al. | 303/119.2 |
| 6,405,752 B1 | * | 6/2002 | Fritsch et al. | 137/550 |
| 6,529,106 B1 | * | 3/2003 | Linhoff et al. | 335/220 |
| 2008/0093573 A1 | * | 4/2008 | Acar et al. | 251/129.15 |
| 2008/0203343 A1 | * | 8/2008 | Kratzer | 251/129.15 |

FOREIGN PATENT DOCUMENTS

| | | |
|---|---|---|
| WO | 02/12039 A1 | 2/2002 |
| WO | 2007/033855 A1 | 3/2007 |

* cited by examiner

VALVE ASSEMBLY WITH A TWO-PART HOUSING AND PRESS-IN RING

This application is a 35 U.S.C. §371 National Stage Application of PCT/EP2010/066861, filed on Nov. 5, 2010, which claims the benefit of priority to Serial No. DE 10 2009 060 729.3, filed on Dec. 29, 2009 in Germany, the disclosures of which are incorporated herein by reference in their entirety.

The disclosure concerns a valve assembly with a valve, in particular a solenoid valve, which comprises an at least two-part housing that has a first housing sleeve and a second housing sleeve, wherein the housing sleeves are held against each other by compression of a fastening zone, and with a valve receptacle in which the valve is inserted and held by means of a press-in ring lying in the region of the fastening zone.

BACKGROUND

Valve assemblies of the generic type are known. They are used in particular for hydraulic monitoring and control purposes, for example in brake circuits of motor vehicles. Here the valve has an at least two-part housing wherein the housing parts are formed as housing sleeves and are pressed together in a fastening zone for connection. This design is commonly used, in particular in normally closed solenoid valves, for safe and economic production. Here the first housing sleeve has a stepped collar which is compressed radially by the outer wall of the second valve sleeve. The disadvantage is that when such valves are installed by pressing into a valve receptacle to create a valve assembly, force is transmitted via the stepped collar which extends over the second valve sleeve in the fastening zone. As a result in unfavorable cases, previously set valve key values and specifications can be achieved since, on unfavorable force transmission, plastic deformations can occur in the region of the stepped collar of the first valve sleeve. It is practically impossible to allow in advance for such possible deformations from force transmission on pressing the valve into the valve receptacle since the press-in force to be applied can vary substantially from valve to valve and can fluctuate within the range of several Kilonewtons.

SUMMARY

These drawbacks are advantageously avoided with the proposed valve assembly. A valve assembly is proposed with a valve, in particular with a solenoid valve, which comprises an at least two-part housing that has a first housing sleeve and a second housing sleeve, the housing sleeves being held against each other by compression of a fastening zone, and with a valve receptacle in which the valve is inserted and held by means of a press-in ring lying in the region of the fastening zone. Here it is proposed that the press-in ring lies radially against the first housing sleeve and axially against the second housing sleeve. The press-in ring consequently applies axial pressure on the second housing sleeve but (only) radial pressure on the first housing sleeve. The force transmission to the second housing sleeve consequently takes places not via the first housing sleeve but directly by the axial contact on the second housing sleeve. Material stress on the first housing sleeve, in particular an undesirable plastic deformation, in the contact region of the press-in ring or by force application through the press-in ring cannot therefore occur. The force to be applied to install the valve in the valve receptacle is applied directly to the second housing sleeve in the axial direction.

In a further embodiment it is provided that the second housing sleeve has an axial ring groove in which the first housing sleeve engages. The second housing sleeve has an axial ring groove formed in the axial direction and open in the direction of the press-in ring to be used to mount the valve assembly. The first housing sleeve engages in this axial ring groove. In contrast to the prior art, the second housing sleeve is consequently not surrounded on the outside by at least one segment of the first housing sleeve. The first housing sleeve is rather held by the axial ring groove with its open end region facing the second housing sleeve.

In a preferred embodiment the first housing sleeve engages with an outward pointing ring flange or with an outward turned crimp edge in the axial ring groove of the second housing sleeve. For this the first housing sleeve has the ring flange directed outward i.e. formed toward the outside in the radial direction, or the outward turned crimp edge, in the region of which there is to some extent a reversal of the material course direction in the backward direction of the first housing sleeve, and which viewed in cross section constitutes an approximately upwardly open eyelet.

Preferably the press-in ring axially pressurizes to the ring flange or the crimp edge. This further secures the first and second housing sleeve against axial separation. Also via the ring flange or particularly advantageously via the outward turned crimp edge compressed axially by the press-in ring, a seal of the first and second housing sleeve is achieved via the press-in ring. This seal acts in addition to the compression of the first and second housing sleeve in the fastening zone. In particular the crimp edge and/or the ring flange can be matched to the depth of the axial ring groove so that on contact of the press-in ring, the desired sealing effect is achieved, for example by an expansion of the crimp edge caused by axial pressurization via the press-in ring and filling the groove width of the axial ring groove. In particular very advantageously, the depth of the ring groove can be matched to the material thickness of the ring flange.

In a further embodiment it is proposed that the press-in ring lies on a face wall of the second housing sleeve, forming an axial stop, wherein the face wall stands at an angle, in particular a 90° angle, to a side wall of the axle ring groove and abuts the latter. The axial ring groove has a side wall which stands at an angle, in particular a 90° angle, to the face wall and abuts the latter, for example forming a side of the axial ring groove. This face wall forms the axial stop for the press-in ring. The press-in ring consequently transmits the force to this axial stop so that the force is transferred by the press-in ring to the second housing sleeve and there is no significant force application to the first housing sleeve or its ring flange or crimp edge, and undesirable effects on their material structure are therefore advantageously avoided.

In a further embodiment it is proposed that the press-in ring lies axially on a ring step of the valve receptacle. By lying on the ring step formed in or on the valve receptacle, a defined valve seat is achieved in the valve receptacle. The press-in ring is namely limited in its forward movement by the ring step when the valve is pressed in in the axial direction over the second housing sleeve. Excessive pressing in is thus advantageously avoided.

In a further embodiment it is proposed that the side walls of the axial ring groove are formed with different heights. The axial ring groove consequently, viewed in cross section, is not formed symmetrically but has side walls of different heights.

In one embodiment the inner side wall of the axial ring groove is formed higher than the outer side wall of the axial ring groove.

Furthermore it is proposed that the valve assembly belongs to an ABS, TCS and/or ESP system of a motor vehicle. Such valve assemblies can be used particularly advantageously and economically in particular in such hydraulic or electro-hydraulic systems, wherein due to the valve assembly described a very high level of reliability and operating safety is guaranteed with simplified production.

Further advantageous embodiments arise from the subclaims and combinations thereof.

BRIEF DESCRIPTION OF THE DRAWINGS

Features of the disclosure are now explained in more detail below with reference to embodiment examples without being restricted to these in which examples.

DETAILED DESCRIPTION

Figure 1:
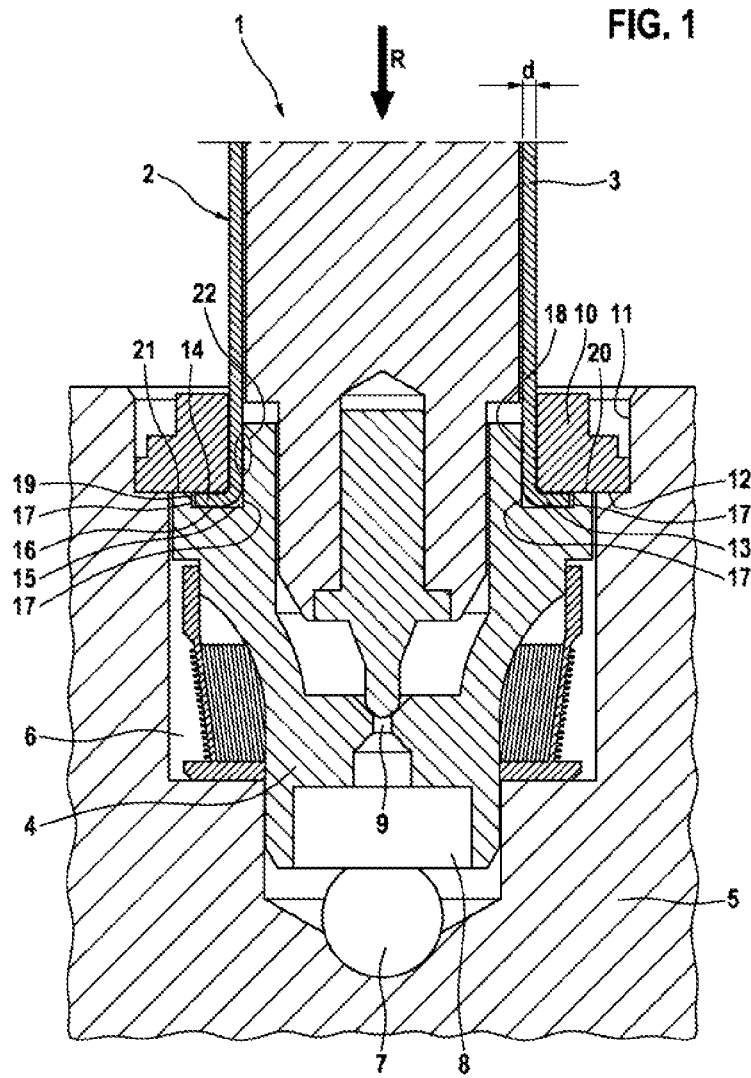
FIG. 1 shows a valve with a first housing sleeve with an outward pointing ring flange.

FIG. 1 shows in segments, in longitudinal section view, a solenoid valve 1 with a two-part housing 2, wherein the housing 2 is formed by a first housing sleeve 3 and a second housing sleeve 4 adjacent thereto in the axial direction. The solenoid valve 1 is here shown in its installation position in a pump housing 5 of a hydraulic unit of a motor vehicle. To hold the solenoid valve 1, the pump housing 5 has a valve receptacle 6 which communicates with a hydraulic channel 7 and wherein the solenoid valve 1 is inserted in the valve receptacle 6 in axial direction R such that a supply opening 8 made on the face of the second housing sleeve 4 for the medium which communicates with a valve seat 9, adjacent in the axial extent of the solenoid valve 1, protrudes into the region of the hydraulic channel 7. The solenoid valve 1 in the installation position shown is held on the pump housing 5 by a press-in ring 10 which axially pressurizes the solenoid valve 1 and rests on the second housing sleeve 4 of the solenoid valve in the axial direction and on the first housing half 3 of the solenoid valve 1 in the radial direction. The press-in ring 10 is further supported on an inner wall 11 of the valve receptacle 6 and in the axial direction on a valve receptacle ring step 12. The first housing sleeve 3 on its end 13 facing the second housing half 4 has a peripheral ring flange 14 which lies in an axial ring groove 15 peripheral the second housing sleeve 4 and facing the first housing sleeve 3. The axial ring groove 15 has a groove base 16 and side walls 17, wherein an inner side wall 18 is higher than an outer side wall 19 of the axial ring groove 15. The outer side wall 19 is limited radially outwardly at the top by a face wall 20. The face wall 20 here stands at a right angle (90° angle) to the outer side wall 19. The face wall 20 is pressurized in the axial direction by the press-in ring 10, wherein the face wall 20 forms an axial stop 21. The axial stop 21 here serves, when the solenoid valve 1 is pressed into the valve receptacle 6 by means of the press-in ring 10, to transmit force to the solenoid valve 1 via the second housing sleeve 4. The first housing sleeve 3 is here not pressurized or only to a slight extent (namely by unavoidable friction connection always present) by force in axial direction 30 R so that in the region of the connection of the first housing sleeve 3 and second housing sleeve 4, namely in a fastening zone 22 in which the first housing sleeve 3 and the second housing sleeve 4 are held against each other for example by compression before installation in 35 the valve receptacle 6, there is no undesirable force application; in the region of the fastening zone 22 there is merely a contact of the press-in ring 10 on the first housing sleeve in the radial direction. This avoids undesirable deformations or deterioration of the housing 2 in the region of the fastening zone 22 when pressed in by the press-in ring 10, since substantial forces must be applied to the solenoid valve 1 for pressing into the valve receptacle 6 by means of the press-in ring 10. In the present embodiment these forces are applied in axial direction R only by the axial stop 21 so that a reliable and constant force application is possible without deterioration in the fastening zone 22. To guarantee this, the outer side wall 19 is formed so high that it either only projects slightly beyond a material thickness d of the first housing sleeve 3 in the region of the ring flange 14 so that the ring flange 14 itself which lies in the axial ring groove 15 is subject to no pressurization by force or only negligible pressurization by force in the axial direction R, or it is structured such that the ring flange 14 which lies in the axial ring groove 15 is subject to pressurization by force in axial direction R such that it is pressed tightly into the groove base 16. In this way an additional peripheral seal of the first housing sleeve 3 on the second housing sleeve 4 is achieved in the regions of the groove base 16 and between ring flange 14 and press-in ring 10.

Figure 2:
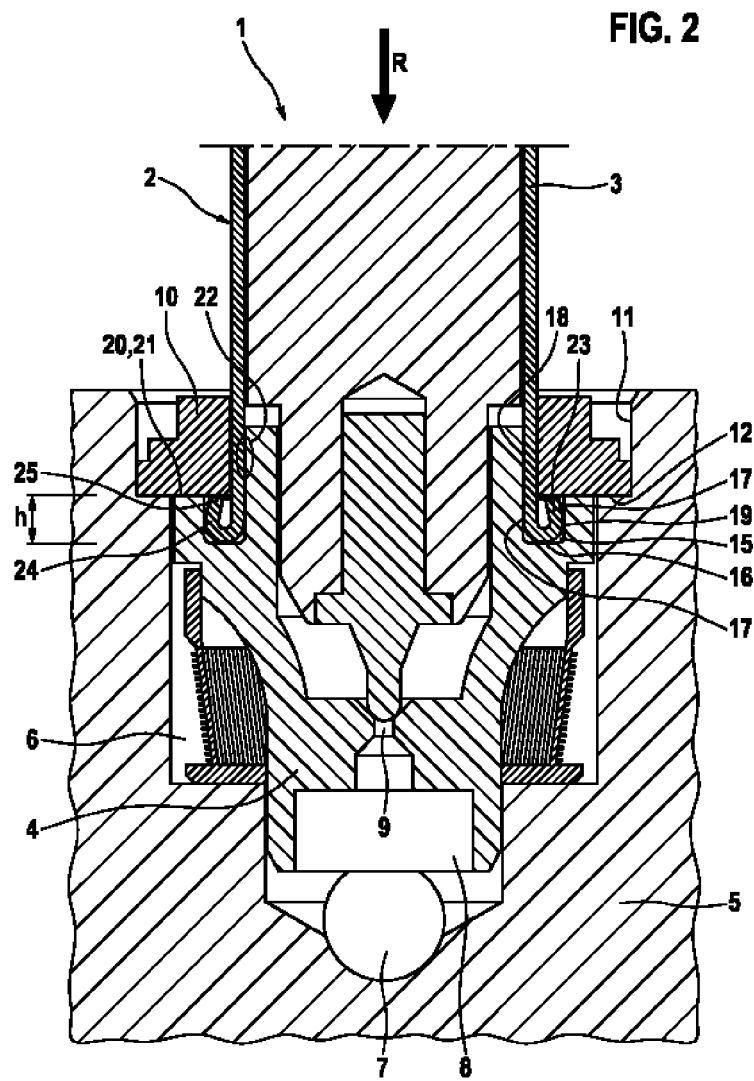
FIG. 2 shows a valve with an outward turned crimp edge.

FIG. 2 shows a solenoid valve 1 of substantially the same design as described in FIG. 1, in its installation position in the pump housing 5. Consequently only the deviations of the structural design from the embodiment shown in FIG. 1 are described. By contrast to the embodiment shown in FIG. 1, the first housing sleeve 3 does not have the ring flange 14 shown in FIG. 1 but an outward turned crimp edge 23. The crimp edge 23 lies in the axial ring groove 15 which lies on the periphery of the face of the second housing sleeve 4 and is limited by the groove base 16 and side walls 17, wherein the side walls 17 stand at a right angle to the groove base 16 and the crimp edge 23 rests on the groove base 16 in axial direction R. The crimp edge 23 viewed in cross section here has the form of an outwardly curved eyelet 24 open at the top. The axial ring groove has an inner side wall 18 and an outer side wall 19, wherein the outer side wall 19 in the longitudinal extent of the solenoid valve 1 is formed so high that it approximately reaches a height h of the crimp edge 23 or the crimp edge 23 projects out of the axial ring groove 15 slightly beyond the outer side wall 19. The outer side wall 19 again abuts at a 90° angle the axial stop 21 which is formed by the face wall 20 and is pressurized by the press-in ring 10 in axial direction R and on installation in the valve receptacle 6 of the pump housing 5, presses in the solenoid valve 1 and holds it in the installation position. If the crimp edge 23 protrudes slightly beyond the outer side wall 19, its edge end 25 which protrudes beyond the outer side wall 19 in the direction towards the press-in ring 10, is also pressurized by force such that the crimp edge 23 is deformed, pressing the crimp edge 23—utilizing to the maximum the expansion of the axial ring groove 15—against the groove base 16 and the side walls 17 of the axial ring groove 15, and thus because of the geometry of the crimp edge 23—namely forming an expanded eyelet 24 when viewed in cross section—causing it to lie with an all-round seal against the side walls 17 and the groove base 16. Again on pressing the solenoid valve 1 into the valve receptacle 6 of the pump housing 5, force is transmitted via the press-in ring 10 via the axial stop 21 formed on the second housing sleeve 4, and not in the region of the fastening zone 22 in which the first housing sleeve 3 and second housing sleeve 4 are held against each other. Here again highly advantageously, a deformation of the housing 2 by force transmission on pressing in the solenoid valve 1, which is possible in the prior art by a possible undesirable force transmission in the region of the fastening zone 22, is avoided.

The invention claimed is:

1. A valve assembly, comprising:
a valve including an at least two-part housing that has a first housing sleeve and a second housing sleeve, the housing sleeves being held against each other by compression of a fastening zone;
a valve receptacle in which the valve is inserted in a region of the fastening zone; and
a press-in ring configured to retain the valve in the valve receptacle, wherein:
the press-in ring lies radially against the first housing sleeve and axially against the second housing sleeve,
the valve is held in the valve receptacle primarily by the press-in ring,
the second housing sleeve has an annular groove in which the first housing sleeve engages, and
the first housing sleeve engages the annular groove with one of an outward pointing ring flange and an outward turned crimp edge.

2. The valve assembly as claimed in claim 1, wherein the press-in ring is configured to axially pressurize the one of the ring flange and the crimp edge to retain the valve in the valve receptacle.

3. The valve assembly as claimed in claim 1, wherein the valve receptacle includes an annular step surface substantially normal to an axial direction of the valve, and the press-in ring lies axially on the annular step surface.

4. The valve assembly as claimed in claim 1, wherein the valve assembly belongs to an ABS, TCS and/or ESP system of a motor vehicle.

5. The valve assembly as claimed in claim 1, wherein the valve includes a solenoid valve.

6. A valve assembly, comprising:
a valve including an at least two-part housing that has a first housing sleeve and a second housing sleeve, the housing sleeves being held against each other by compression of a fastening zone;
a valve receptacle in which the valve is inserted in a region of the fastening zone; and
a press-in ring configured to retain the valve in the valve receptacle, wherein:
the press-in ring lies radially against the first housing sleeve and axially against the second housing sleeve,
the valve is held in the valve receptacle primarily by the press-in ring, and
the second housing sleeve includes an inner side wall, an outer side wall, and a face wall adjacent and at an angle to one of the inner side wall and the outer side wall and against which the press-in ring abuts so as to form an axial stop.

7. The valve assembly as claimed in claim 6, wherein the inner side wall and the outer side wall of the second housing sleeve define an annular groove in which the first housing sleeve engages.

8. The valve assembly as claimed in claim 6, wherein the angle is a 90° angle.

9. A valve assembly, comprising:
a valve including an at least two-part housing that has a first housing sleeve and a second housing sleeve, the housing sleeves being held against each other by compression of a fastening zone;
a valve receptacle in which the valve is inserted in a region of the fastening zone; and
a press-in ring configured to retain the valve in the valve receptacle, wherein:
the press-in ring lies radially against the first housing sleeve and axially against the second housing sleeve,
the valve is held in the valve receptacle primarily by the press-in ring,
the second housing sleeve has an annular groove in which the first housing sleeve engages,
the second housing sleeve includes an inner side wall and an outer side wall defining the annular groove, and
the inner and outer side walls have different axial lengths.

10. The valve assembly as claimed in claim 9, wherein the inner side wall extends in an axial direction of the valve a greater distance than the outer side wall.

11. A valve assembly, comprising:
a valve including an at least two-part housing that has a first housing sleeve and a second housing sleeve, the housing sleeves being held against each other by compression of a fastening zone;
a press-in ring; and
a valve receptacle in which the valve is inserted and held by the press-in ring lying in the region of the fastening zone,
wherein the press-in ring lies radially against the first housing sleeve and axially against the second housing sleeve, and
wherein the second housing sleeve includes an inner side wall and an outer side wall radially opposite the inner side wall defining an annular groove therebetween, and a portion of the first housing sleeve is positioned in the annular groove.

12. The valve assembly as claimed in claim 11, wherein the first housing sleeve engages the annular groove.

13. The valve assembly as claimed in claim 11 wherein the first housing sleeve engages the annular groove with one of an outward pointing ring flange and an outward turned crimp edge.

14. The valve assembly as claimed in claim 13, wherein the press-in ring is configured to axially pressurize the one of the ring flange and the crimp edge.

15. The valve assembly as claimed in claim 11, wherein the second housing sleeve includes a face wall adjacent and at an angle to one of the inside side wall and the outside side wall and against which the press-in ring abuts so as to form an axial stop.

16. The valve assembly as claimed in claim 11, wherein the valve receptacle includes an annular step surface substantially normal to an axial direction of the valve, and the press-in ring lies axially on the annular step surface.

17. The valve assembly as claimed in claim 11, wherein the inner side wall and the outer side wall defining the annular groove have different axial lengths.

18. The valve assembly as claimed in claim 17, wherein the inner side wall extends in an axial direction of the valve a greater distance than the outer side wall.

* * * * *